Sept. 29, 1942.   R. HINTZE   2,297,220
MOTOR-COMPRESSOR UNIT FOR REFRIGERATORS
Filed March 20, 1939
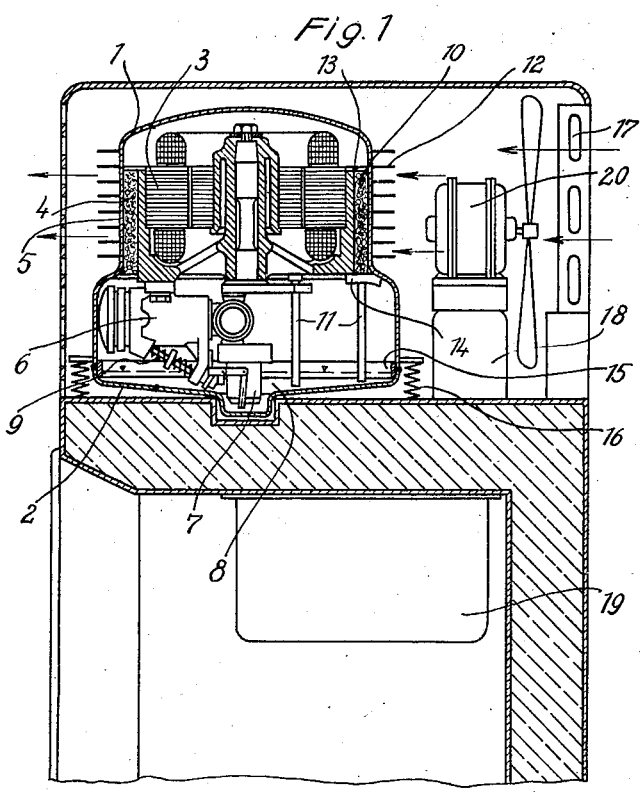
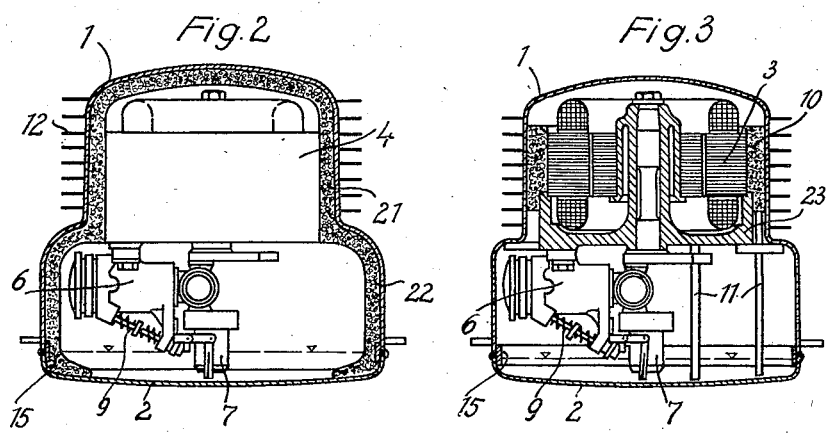
Inventor
Rudolf Hintze
by Knight Bros
Attorneys Patented Sept. 29, 1942

2,297,220

UNITED STATES PATENT OFFICE 2,297,220

MOTOR-COMPRESSOR UNIT FOR REFRIGERATORS

Rudolf Hintze, Berlin-Charlottenburg, Germany; vested in the Alien Property Custodian Application March 20, 1939, Serial No. 262,930
In Germany March 23, 1938

6 Claims. (Cl. 230—233)

This invention relates to a device for conveying fluids, particularly adapted for use in refrigerating apparatus of the compression type.

It is known to avoid stuffing boxes in refrigerating apparatus of the compression type by hermetically sealing the electric motor and the compressor within a common housing. In one of the known refrigerating apparatus of this type the stator casing of the electric motor is tightly fitted into a bell-shaped portion of the metallic housing so that the heat of the motor-compressor set is readily transferred to the outer walls of the housing. This requires a careful machining of the inner surface of the housing and the outer surface of the stator. Furthermore, due to the direct contact of the stator with the ousing, the noise caused by the operation of the compressor becomes rather disturbing. In another known refrigerating apparatus of the compression type the stator of the electric motor has a smaller outer diameter than the inner diameter of the housing and is resiliently supported with respect to the walls of the housing. In this manner the noise caused by the compressor is damped to a considerable extent. However, the housing of the compressor no longer dissipates the heat to the desirable extent obtained in the first-mentioned apparatus. It therefore becomes necessary to provide additional cooling devices.

It is further known to fill the space between the stator and the housing of a compressor driving motor with a liquid, for instance with oil, which transfers the heat to the outside atmosphere. In a known arrangement of this type the rotor of the electric motor is separated by a pressure-tight housing from the stator so that the entire stator is immersed in an oil bath. The efficiency of such an electric motor is low. In another known arrangement also the stator of an electric motor is enclosed in a housing whose outer surface is surrounded by an oil jacket. The oil may absorb the waste heat of the motor and transfer it to the outer housing. In this case the outer surface of the stator and the inner wall of its housing must be carefully machined.

An object of the invention is to provide a hermetically-sealed motor-compressor unit for refrigerating apparatus in which the housng is employed for carrying off the waste heat, and in which the noise is effectively damped without a particular or expensive machining of the stator and the inner wall of the housing being necessary. To this end, according to the invention, an absorbent material such as felt is placed between the stator of the compressor motor and the outer housing and is impregnated with heat conducting liquid, the lubricant of the motor-compressor unit being preferably employed as such liquid.

A conveying device arranged in the housing of the unit may be employed to convey the lubricant from the oil sump to the chamber containing the absorbent material.

The liquid absorbed by the absorbent material transfers the heat, as practical tests have shown, from the outer surface of the stator to the wall of the housing so that it is possible to employ the surface of the housing for effectively carrying off the heat even if the stator is not tightly fitted into the housing. The use of absorbent material has the further advantage over the known motor-compressor sets operating with an indirect transfer of heat by means of a liquid, that the noise is damped to a considerable extent.

In arrangements according to the invention one or more wicks may be employed which extend from the absorbent material into the oil sump. Such wicks are sufficient to maintain the absorbent material in soaked condition. A particularly effective sound deadening may be obtained by lining not only the portion of the housing adjacent to the stator but also the other parts thereof with the absorbent material. The fact that a particular machining of the housing and of the adjacent surface of the motor is unnecessary, is especially of importance when manufacturing such units on a large scale.

Other objects, advantages and features of the present invention will become apparent from the following description of the three embodiments shown in the accompanying drawing in diagrammatic form.

Fig. 1 represents a cross section through the upper part of a domestic refrigerator equipped with a motor-compressor unit according to the invention.

Fig. 2 shows a part-sectional view of another modification of such a motor-compressor unit, and Fig. 3 shows an axial cross section through a third modification.

Similar elements in the three figures are designated by similar reference numerals.

Referring at first to the refrigerator shown in Fig. 1, the motor-compressor set is hermetically sealed in a housing consisting of an upper bell-shaped portion 1 and a bottom portion 2. The laminated stator 3 of the electromotor is arranged in a casing 4 whose outer diameter is smaller than the inner diameter of the corresponding cylindrical portion 5 of the housing. 6 denotes the piston compressor firmly secured to the casing 4. An oil pump 7 is associated with the compressor so that both are actuated by the motor with the aid of a common crank shaft, as is described more in detail in my U. S. Patent No. 2,164,405. The pump 7 is partly immersed in the oil sump 8 of the housing. The pump cooperates with the valve needle 9 of a pressure-relief valve which, in order to facilitate the starting of the refrigerating apparatus, establishes a free communication between the suction chamber and the pressure chamber of the compressor when the apparatus is at rest, and which automatically closes the communication after the apparatus has been started and a given oil pressure is produced by the pump. Details of this construction are also apparent from my aforementioned patent and are not illustrated in the drawing of the present case because they do not represent essential features of the present invention proper. The oil delivered by the pump serves to lubricate all parts of the motor-compressor set. The interstice between the casing 4 and the portion 5 of the housing is filled by a jacket 10 consisting of an absorbent material, for instance felt. One or more wicks 11 extend from this felt jacket into the oil sump 8. In this manner part of the lubricant is sucked into the jacket 10 and ensures a good transfer of heat from the casing 4 to the surface of the housing. The housing portion 5 adjacent to the jacket 10 is provided with cooling ribs 12. The casing 4 of the stator is connected to the housing by connecting pieces 13, 14 arranged preferably at the upper and lower end of the casing 4. These connecting pieces consist preferably of springs which serve to damp the oscillations of the set.

The diameter of the bottom 2 of the housing is equal to the diameter of the adjacent portion of the bell-shaped container 1. To avoid at the joint a particular machining of the inner surface of the bell-shaped container 1, a split ring 15 is provided, which facilitates the welding operation. Before welding the bottom 2 to the bell-shaped portion 1, the ring is inserted into the lower end of the portion 1 in such a manner that the ring projects therefrom by half its height. The bottom is then placed over the ring and the three pieces 1, 2 and 15 are welded together. When welding by means of a gas torch, the ring 15 prevents, to a great extent, the gas from entering the housing. The housing is supported on the upper part of the refrigerator by springs 16. The condenser 17 of the refrigerating system is arranged at the rear side of the refrigerator cabinet. 18 is a container in which is preferably arranged a float-controlled valve. 19 is the evaporator of the refrigerating apparatus arranged in the cooling chamber. On the container 18 is mounted a fan 20 which causes a current of cooling air to flow over the heat radiating surfaces of the condenser 17 and the compressor housing.

In the embodiment shown in Fig. 2, a jacket 21 of absorbent material lines the inner surface of the housing not only between the casing 4 and the adjacent portion 5 of the housing, but surrounds also the other parts thereof. The lower portion 22 of this lining extends into the oil sump 8 and serves as a wick for the lubricant to be conveyed in the upward direction. The arrangement shown in this embodiment is particularly advantageous, as the inner lining forms a very effective sound deadening means.

While in the embodiments shown in Figs. 1 and 2, the absorbent material is arranged around a stator casing, the embodiment shown in Fig. 3, is so designed that the absorbent material 10 contacts directly with the stator stampings 3. The stator casing 23 embraces only the lower portion of the stator stampings for centering the laminated stator.

What is claimed is:

1. In a motor-compressor unit, in particular for a refrigerator, the combination of a compressor, an electromotor operatively connected with said compressor, an hermetically sealed housing containing lubricant and enclosing said motor and said compressor, said housing and said motor being spaced from each other to form an interstice around said motor, noise-damping absorbent material disposed in said interstice substantially filling said interstice around its entire periphery, and means for supplying part of said lubricant to said material.

2. In a motor-compressor unit, in particular for a refrigerator, the combination of a compressor, an electromotor operatively connected with said compressor, and hermetically sealed housing enclosing said motor and said compressor, said housing having a bottom portion extending underneath said motor and compressor and forming a sump, a lubricant disposed in said sump, means operatively associated with said motor and connected with said sump to supply lubricant from said sump to said motor and compressor, said motor and compressor being spaced circumferentially from said housing so as to form an annular interstice at the inner periphery of said housing, noise-damping absorbent material disposed in said interstice, said material extending into said sump to become soaked with lubricant for improving the heat transfer from said motor and compressor to said housing.

3. In a motor-compressor unit, in particular for a refrigerator, a motor-compressor set, a welded housing fully enclosing said set, said housing having a bell-shaped upper portion and a cover-shaped bottom portion, said set being arranged in said upper portion and circumferentially spaced from the peripheral wall of said upper portion so as to form an annular interstice, noise-damping absorbent material arranged in said upper portion and disposed in said interstice, a quantity of lubricant disposed in said bottom portion, means for supplying lubricant from said bottom portion to said set, means extending from said material into said bottom portion for supplying lubricant to said material, and a ring arranged in said housing so as to cover the joint between said upper portion and said bottom portion, said ring being welded to said two portions to hermetically seal said housing.

4. In a refrigerating motor-compressor set an electromotor, a housing hermetically enclosing said motor, a layer of noise-damping absorbent material arranged between said housing in said motor and surrounding said motor so as to hold motor and housing in position relative to each other, a quantity of lubricant disposed in said housing, a lubricating circulation system in said housing comprising a pump operatively associated with said motor to circulate lubricant through the places to be lubricated of the set, and means in said housing disposed outside of said circulation system for supplying lubricant to said absorbent layer so as to keep said layer soaked with lubricant.

5. In a refrigerating unit, the combination of a motor-compressor set, an hermetically sealed housing enclosing said set and having a bottom portion forming a collecting container, a quantity of liquid disposed in said housing so as to collect in said bottom portion, said set and said housing being circumferentially spaced from each other to form an annular interstice, noise-damping absorbent material disposed in said interstice so as to substantially fill said interstice around its periphery, and means connecting the bottom portion of said housing with said interstice for supplying part of said liquid to said material to maintain said material in soaked condition in order to effect a transfer of waste heat from said set to said housing through a substantially continuous body of liquid absorbed in said material.

6. In a refrigerating unit, the combination of a motor-compressor set, a sealed housing hermetically enclosing said motor and compressor and having a bottom portion disposed underneath said set, a cooling liquid disposed in said bottom portion of said housing, said set and said housing being circumferentially spaced from each other thereby forming an annular interstice around said set, noise-damping absorbent material disposed in said interstice, and wick means connecting said material with said bottom portion to supply part of said liquid to said material to maintain said material in soaked condition in order to effect a transfer of waste heat from said set to said housing through a substantially continuous body of liquid absorbed in said material.

RUDOLF HINTZE.